Figure 1A:
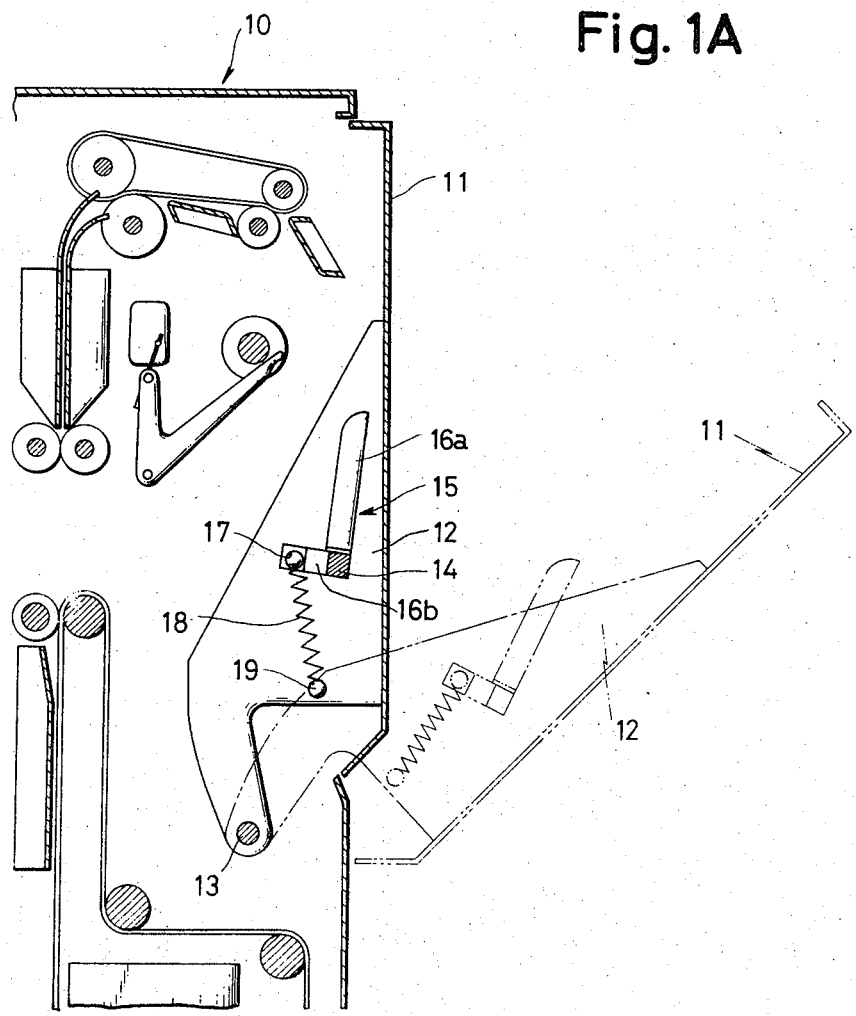

United States Patent [19]
Kono

[11] 3,827,687
[45] Aug. 6, 1974

[54] DEVICE FOR SUPPORTING SENSITIVE PAPER CASSETTE FOR ELECTROPHOTOGRAPHY COPIER

[75] Inventor: Tateomi Kono, Toyokawa, Japan

[73] Assignee: Minolta Camera Kabushiki Kaisha, Osaka, Japan

[22] Filed: Apr. 20, 1972

[21] Appl. No.: 246,033

[30] Foreign Application Priority Data
Apr. 21, 1971 Japan.................................. 46-31286

[52] U.S. Cl................ 271/117, 221/197, 271/110, 271/127, 271/157, 271/160, 271/162
[51] Int. Cl......... B65h 1/12, B65h 1/26, B65h 3/06
[58] Field of Search............ 271/61, 62, 22, 28, 39, 271/117, 127, 162, 163, 110, 157, 160; 312/183, 185, 187; 221/197

[56] References Cited
UNITED STATES PATENTS

| | | | |
|---|---|---|---|
| 103,046 | 5/1870 | Hill..................................... | 312/185 |
| 964,242 | 7/1910 | Greenwalt........................ | 312/183 X |
| 3,357,700 | 12/1967 | Bradicich........................ | 271/62 R X |
| 3,563,535 | 2/1971 | Vitu et al........................... | 271/62 R |
| 3,565,420 | 2/1971 | Howard............................. | 271/61 X |
| 3,580,567 | 5/1971 | Hashimoto......................... | 271/62 |

*Primary Examiner*—Richard A. Schacher
*Assistant Examiner*—James W. Miller
*Attorney, Agent, or Firm*—Wolder & Gross

[57] ABSTRACT

A device for supporting a cassette of sensitive papers for xerography copier to elastically urge the cassette toward the driven feed roller so as to abut the uppermost of the stacked papers to automatically feed one by one to the copying zone, the elastical urging being made at one spot at a back wall of the supporter member in cooperation with the manual closing of the casing lid, and mounting of the cassette on the supporter member is made ready by engagement of a stud having an enlarged stud planted on the back wall of the cassette with a slot having a larger hole portion and a smaller hole portion.

4 Claims, 6 Drawing Figures

DEVICE FOR SUPPORTING SENSITIVE PAPER CASSETTE FOR ELECTROPHOTOGRAPHY COPIER

The invention relates to an improvement of a device for supporting a magazine or a cassette containing a plurality of sensitive papers for electrophotography or xerography copier so as to feed the papers one by one in cooperation with a feed roller driven for rotation in one direction to a copying zone.

It has been in public knowledge and use to automatically feed the sensitive papers contained in a stacked condition the cassette by elastically urging said cassette toward the feed roller for driven rotation so as to frictionally abut on the uppermost of the papers to be forcedly fed to the copying zone. The conventional devices therefor, however, were not satisfactory in that the paper is fed often inclinedly relative the feeding passage so as to be sometimes clogged therein due to unstable or unsymmetrical urging of the supporter device against the feed roller.

It is one of the most important objects of the invention to provide such cassette supporting device as capable of realizing stable and symmetrical contact of the feed roller with the paper whereby the troubles referred to above can be completely eliminated.

The other object of the invention is to provide such device as capable of avoiding damages of the cassette eventually caused by abutting of the feed roller directly on the cassette wall when the sensitive papers therein have been all exhausted so that the cassette itself is rattlingly moved and raised up by the driven feed roller.

The above and other objects as well as attendant advantages which will be appreciated by studying the following description of a preferred embodiment the present invention which comprises a cassette containing a plurality of sensitive papers therein for electrophotography copier and which includes a casing wall having a lid for access therein, a feed roller mounted on said casing wall for driven rotation, and means for driving said feed roller. There is provided cassette supporter member adapted to be elastically urged toward said feed roller so as to abut on the uppermost of the sensitive papers in the cassette supported thereon whereby said sensitive paper may be automatically fed one by one to the copying zone, essentially by pivotally mounting said lid for angular movement between open and close positions, pivotally mounting said cassette supporter member for angular movement between a substantially prone position for receiving the cassette and a substantially upright position for cooperating with the feed roller. Also provided is an actuator lever member pivotally mounted on said lid for angular movement and elastically urged so that the tip of said lever member may urgingly push the back wall of said suporter member at one spot lying substantially on the longitudinal center line thereof toward the feed roller when said lid is manually closed.

Preferably said lid has a pair of brackets each fixed at the opposite side edges thereof so as to project respectively perpendicularly, each bracket being pivoted at the lower end thereof on the casing wall, and said cassette supporter member has a vertical plate and a perpendicularly bent flange, said supporter plate having a pair of brackets respectively fixed at the opposite side edges to project perpendicularly, each bracket being pivotally mounted at the lower end thereof on a pivot parallel to said pivot for the lid. Said actuator lever member is preferably of two arms and mounted for angular movement on a rod transversely extending between said lid brackets substantially at the center thereof, the free end of one arm of said lever member being connected with one end of a spring of which other end is fixed to the lid bracket so as to urge the free end of the other arm of said lever to push the back wall of said supporter member toward the feed roller.

Figure 1B:
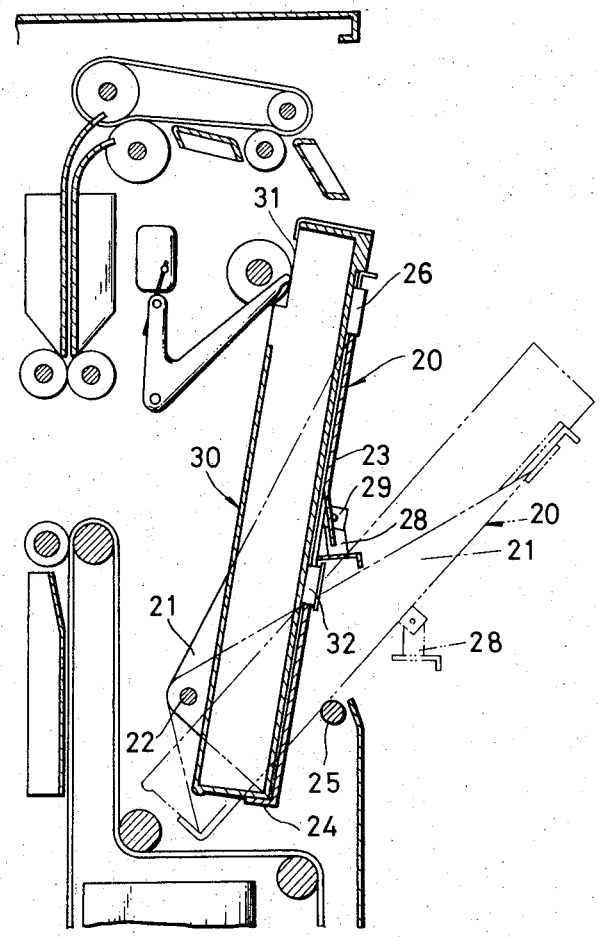
Figure 1C:
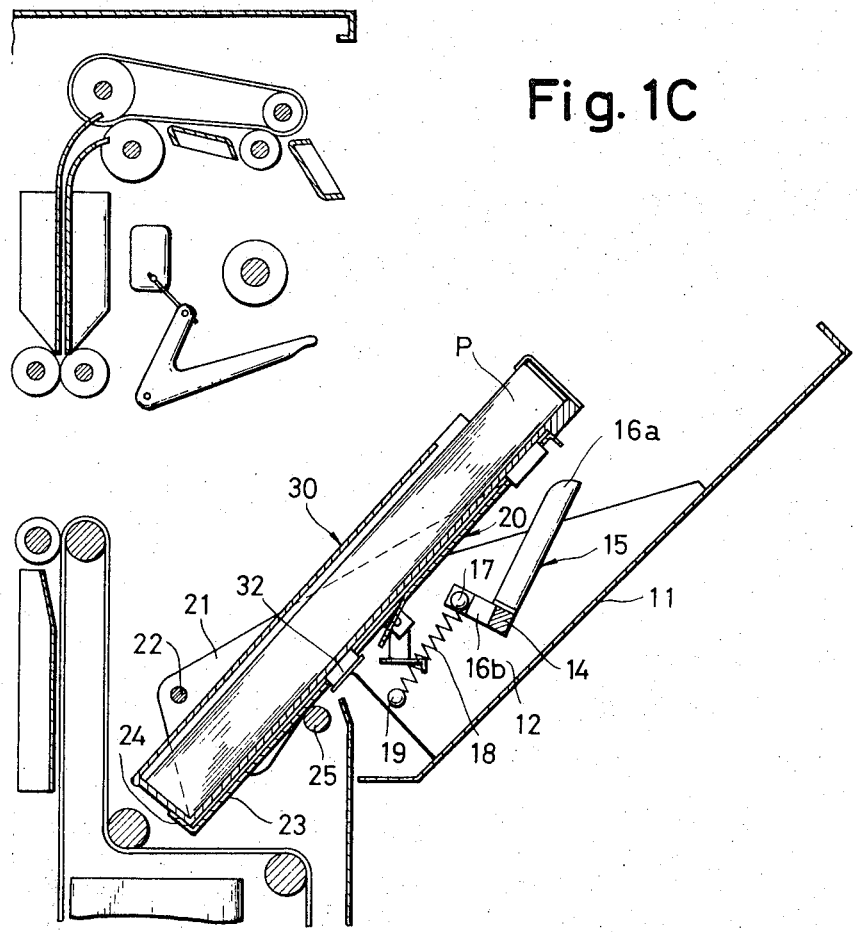
Figure 1D:
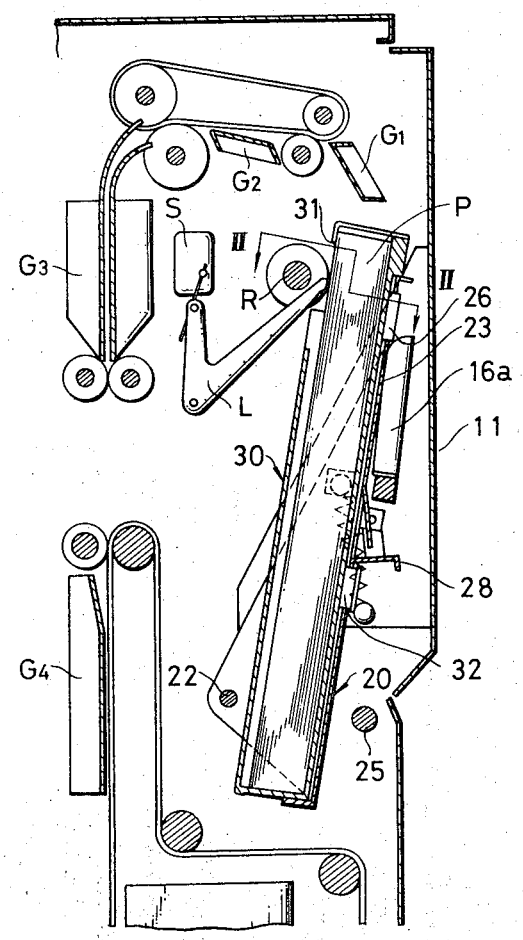
Figure 2:
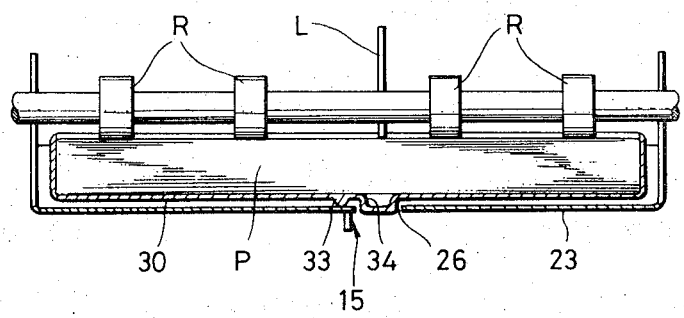
Figure 3:
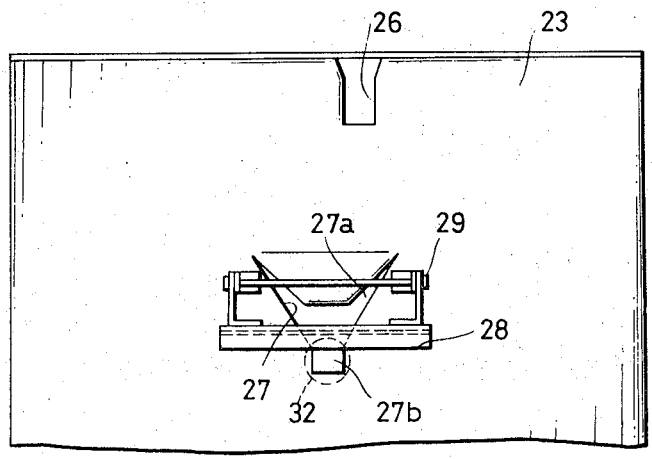

The invention shall be explained hereinafter in more detail and definitiveness in reference to the accompanying drawing for illustrating a preferred embodiment, in which:

FIG. 1A is a schematic view of a part of the xerography copier in section the cassette supporter member being omitted for clearly illustrating the lid member pivoted on the casing side wall so as to angularly move between the close position represented by solid lines and the open position represented by phantom lines, FIG. 1B is a similar view the lid member being omitted for clearly illustrating the supporter member pivoted on the casing wall so as to move between the operation position represented by solid lines and the cassette receiving position represented by phantom lines, FIG. 1C is a similar view showing the lid in the open position and the supporter member in the receipt position and having the cassette held thereon, FIG. 1D is a similar view but showing the lid in the close position and the supporter member in the operation position, FIG. 2 is a section taken along a line II—II in FIG. 1D, and FIG. 3 is a plan view of a part of the vertical plate of the supporter member.

The xerography copier 10 has a lid 11 fixed with a pair of brackets 12 at the opposite side edges thereof to project respectively perpendicularly, each bracket being pivoted by a pivot 13 at the lower end thereof on the respective casing side wall. The lid 11 thus can move angularly between the two positions as best shown in FIG. 1A. Between the two brackets 12 there is provided a transversely extending rod 14 on which an L-shaped actuator lever as represented generally by 15 is mounted for angular movement substantially at the center thereof. Said lever 15 has a vertical arm 16a and a transverse arm 16b which has a pin 17 planted at the free end. A coiled spring 18 of which one end is fixed to said pin 17 and the other end is fixed to a pin 19 planted on said bracket 12, is provided so that the tip of said lever arm 16a is urged to angularly move in the counterclockwise direction in FIG. 1A.

As best shown in FIG. 1B, a supporter member as represented generally by 20 is fixed with a pair of brackets 21 at the opposite side edges thereof, each of said brackets 21 being pivoted at the lower end thereof on a pivot 22 parallel to said pivot 13 for the lid 11 so that said supporter member 20 may angularly move between the two positions. The supporter member 20 comprises a vertical plate 23 and a perpendicularly bent flange 24 at the lower end thereof. There is provided a transversely extending stopper pin 25 fixed to the casing side wall so that the vertical plate 23 abuts on said pin 25 for limiting the angular movement of the supporter member 20 to lie in the cassette receiving position. The plate 23 has an opening 26 at the upper portion thereof for the purpose to be referred to hereinafter and a slot 27 substantially at the center, as best shown in FIG. 3. The slot 27 is preferably Y-shaped and consists of an upper larger hole portion 27a and a lower smaller hole portion 27b. The plate 23 of the supporter member is provided with a weight stopper 28 as pivoted 29 thereon just above said slot 27 to be vertically suspended due to its gravity for the purpose to be referred to hereinafter and as shown in solid lines when the supporter member 20 is in the operation position and in phantom lines when said supporter member is in the cassette receiving position in FIG. 1B.

The supporter member is for holding a cassette as represented generally by 30, which has an open window 31 formed in the front wall at the upper portion thereof. The cassette 30 has a stud 32 planted at the back wall thereof. Said stud 32 has an enlarged head so as to be engaged in the larger hole portion 27a of the supporter plate 23 firstly when resting the cassette 30 on the supporter member 20 and then the cassette 30 is slightly pulled down to engage the root of said stud in the smaller hole portion 27b, where the cassette bottom rests on the supporter flange 24.

Now referring to FIG. 1C, the lid 11 is in the open position. The supporter member 20 pivoted at 22 and having its gravity center lying in the upper portion thereof has thus been angularly moved from the operation position to the position for receiving the cassette with abutting the back wall on the stopper pin 25. The cassette 30 containing a plurality of sensitive papers P stacked therein is laid on the supporter plate 24 with engaging the stud 32 in the slot 27 as referred to above.

When the lid 11 is manually pushed to be angularly moved in the counterclockwise direction in FIG. 1C, the tip of the actuator lever arm 16a urged by means of the spring 18 may abut on the supporter plate 23. Further angular movement of the lid 11 will accompany the supporter member 20 and consequently the cassette 30 reclined thereon to be brought into the position as illustrated in FIG. 1D, in which position the weight stopper 28 vertically suspended engages at the free end with the stud 32 so as to avoid rattling movement and/or rising up due to direct contact of the driven feed roller R with the cassette wall when all papers has been exhausted.

The supporter member 20 pivoted at 22 is thus pushed by the tip of the lever arm 16a at the supporter plate 23 thereof on one spot lying on the longitudinal center line thereof so, that the cassette 30 is stably and symmetrically urged toward a feed roller R which is mounted for driven rotation on the casing wall so as to face the open window 31 formed in the front wall of the cassette as being now in the operation position. It is preferable to provide a plurality of rollers R fixedly mounted on a shaft as seen in FIG. 2. The rollers R driven by a prime mover, not shown, in the counterclockwise direction in FIG. 1D may thus be forcingly contacted on the uppermost of the papers P in stable and symmetrical state so as to frictionally feed the same upwardly, which will then pass along guide members $G_1$, $G_2$, $G_3$ and $G_4$ to be fed to the copying zone. It is preferable in order to enhance said desirable effect to provide a longitudinal rib 33 on the back wall of the cassette 30 substantially at the longitudinal center line thereof so that urging force applied on the supporter plate 23 by means of the lever 15 in cooperation with the spring 18 may be transmitted to the cassette 30 in more satisfactory manner via said longitudinal rib 33.

It is preferable to provide a two-arm lever L pivoted at the portion between the two arms on the casing wall so that the free end of the first arm may be elastically urged on the uppermost of the papers P in the cassette 30, whereby when all papers P have been exhausted said free end is allowed to project through a hole 34 formed in the cassette back wall and the hole 26 formed in the supporter plate 23. Thus the free end of the second arm of said lever L is angularly moved so much in the clockwise direction in FIG. 1D which movement is transmitted to a lever for actuating a microswitch S, whereby an alarm lamp or buzzer is energized to inform the exhaustion of the papers P in the cassette 30.

What is claimed is:

1. Device for supporting a cassette containing a plurality of sensitive papers therein for an electrophotographic copier, which comprises a casing wall having a lid for access therein, a feed roller mounted on said casing wall for driven rotation, a prime mover for driving said feed roller, and a cassette supporter member adapted to be elastically urged so as to bias into engagement with said feed roller the uppermost of the sensitive papers in the cassette supported thereon whereby said sensitive paper may be automatically fed one by one to the copying zone, characterized by pivotally mounting said lid for angular movement between open and closed positions, pivotally mounting said cassette supporter member for angular movement between a substantially lying position for receiving the cassette and a substantially standing position for cooperating with the feed roller, providing an actuator lever member pivotally mounted on said lid for angular movement and elastically urged so that the tip of said lever member may urgingly push the back wall of said supporter member at one spot lying substantially on the longitudinal center line thereof toward the feed roller when said lid is manually closed, said lid having a pair of brackets each fixed at the opposite side edges thereof so as to project respectively perpendicularly, each bracket of said supporter plate being pivoted at the lower end thereof on the casing wall, said cassette supporter member having a vertical plate and a perpendicularly bent flange, said supporter plate having a pair of brackets respectively fixed at the opposite side edges to project perpendicularly, each bracket being pivotally mounted at the lower end thereof on a pivot parallel to said pivot for the lid, and said actuator lever member including two arms and being mounted for angular movement on a rod transversely extending between said lid brackets substantially at the center thereof, the free end of one arm of said lever member being connected with a spring of which one end is fixed to the lid bracket so as to urge the free end of the other arm of said lever member to push the back wall of said supporter member toward the feed roller.

2. Device as claimed in claim 1, characterized in that said cassette has a stud mounted on the back wall, said supporter plate has a slot formed therein and a weight stopper pivoted at the root on said supporter plate so that the free end of said weight stopper vertically suspended may abut on the cassette stud protruded out of the supporter plate slot when the supporter member and the cassette held thereby are in the standing position.

3. A device for supporting a cassette containing a stack of copy papers therein for electrophotographic copying, which comprises a casing wall having a lid for access therein, a feed roller mounted in said casing for driven rotation, a prime mover for driving said feed roller, and a cassette supporter member adapted to be elastically urged so as to bias into engagement with said feed roller the uppermost of the sensitive papers in the cassette supported thereon whereby said sensitive paper may be automatically fed one by one to the copying zone, characterized by pivotally mounting said lid for angular movement between open and closed positions, pivotally mounting said cassette supporter member for unitary angular movement at least partially independently of the movement of said lid between a substantially lying position for receiving the cassette and a substantially standing position for cooperating with the feed roller, providing an actuator lever member pivotally mounted on said lid for angular movement about a transverse axis movable with said lid and elastically urged so that the tip of said lever member may urgingly push the back wall of said supporter member at one spot lying substantially on the longitudinal center line thereof toward the feed roller when said lid is manually closed, said cassette having a longitudinal rib on the back wall thereof substantially along the longitudinal center line so that said urging force of said lever member is transmitted via said rib to the cassette for attaining more stable and symmetrical urging by the feed roller on the sensitive paper in the cassette.

4. A device for supporting a cassette containing a stack of copy papers therein for electrophotographic copying, which comprises a casing wall having a lid for access therein, a feed roller mounted in said casing for driven rotation, a prime mover for driving said feed roller, and a cassette supporter member adapted to be elastically urged so as to bias engagement with said feed roller the uppermost of the sensitive papers in the cassette supported thereon whereby said sensitive paper may be automatically fed one by one to the copying zone, characterized by pivotally mounting said lid for angular movement between open and closed positions, pivotally mounting said cassette supporter member for unitary angular movement at least partially independently of the movement of said lid between a substantially lying position for receiving the cassette and a substantially standing position for cooperating with the feed roller, providing an actuator lever member pivotally mounted on said lid for angular movement about a transverse axis movable with said lid and elastically urged so that the tip of said lever member may urgingly push the back wall of said supporter member at one spot lying substantially on the longitudinal center line thereof toward the feed roller when said lid is manually closed, said cassette having a stud located at the back wall thereof, said stud having an enlarged head, said cassette supporter member having a vertical plate and a perpendicular flange, and said supporter plate having a slot formed therein consisting of an upper larger hole portion and lower smaller hole portion so that when mounting the cassette on the supporter member, the enlarged head of the cassette stud is first inserted in said upper larger hole portion of the supporter plate and then the cassette is pulled down so as to fixedly engage the stud root in the lower smaller hole portion where the cassette bottom rests on the supporter flange.

* * * * *